UNITED STATES PATENT OFFICE.

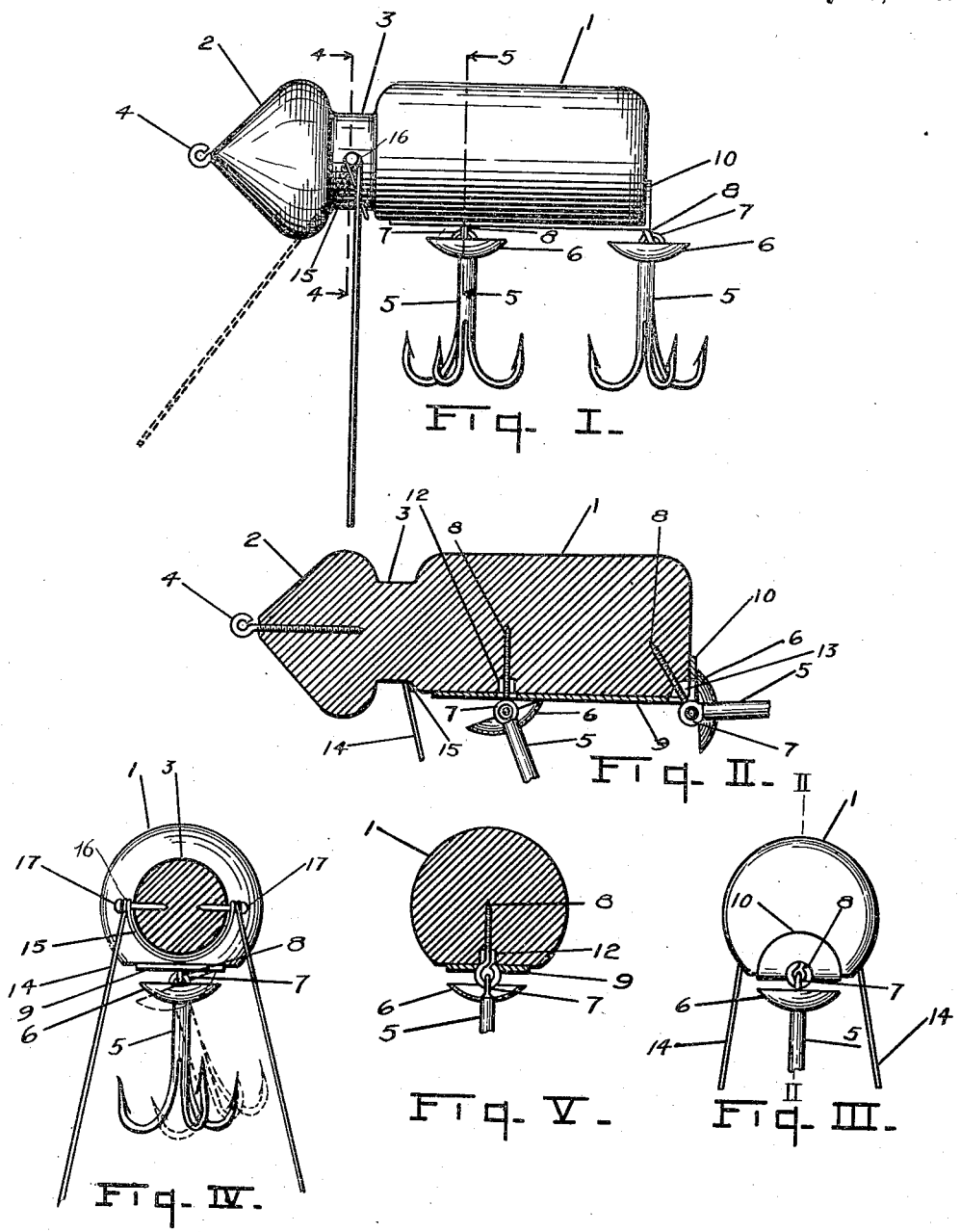

CLIFFORD W. BIDWELL, OF KALAMAZOO, MICHIGAN.

FISH BAIT OR LURE.

1,148,140.    Specification of Letters Patent.    Patented July 27, 1915.

Application filed July 20, 1914. Serial No. 851,947.

*To all whom it may concern:*

Be it known that I, CLIFFORD W. BIDWELL, a citizen of the United States, residing at Kalamazoo, Michigan, have invented certain new and useful Improvements in Fish Baits or Lures, of which the following is a specification.

This invention relates to improvements in fish baits or lures.

The main objects of this invention are: First, to provide an improved fish bait or lure which is substantially weedless and at the same time one in which the hooks are fully exposed to the strike of the fish. Second, to provide in a fish bait or lure an improved means for limiting the swing of the hooks whereby they are properly presented to receive the strike of the fish and supported in proper position.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side view of my improved fish bait or lure with the guard shown in full lines as it hangs freely and by dotted lines in its forward position. Fig. II is a detail longitudinal section on a line corresponding to line 2—2 of Fig. III, with the guard in its rear position, as when the bait is being drawn over an obstruction or propelled through the water, and the hooks in position commonly assumed when being propelled through the water. Fig. III is a detail rear view. Fig. IV is a transverse section through the neck of the lure on a line corresponding to line 4—4 of Fig. I, the hook being shown by dotted lines swung to one side. Fig. V is a detail vertical section on a line corresponding to line 5—5 of Fig. II showing structural details.

In the drawing similar reference characters refer to similar parts throughout the several views, and the sectional views are taken looking in the direction of the little arrows at the ends of the section lines.

Referring to the drawing, my improved bait or lure, as illustrated, comprises a body portion 1, head portion 2 and a reduced or neck portion 3. The head portion is tapered forwardly, the line attaching eye 4 being at its tip.

The hooks 5 are provided with eyed shanks upon which are secured concavo-convex disks 6, the disks being secured so as to face inwardly and embrace the eyes 7. The hook attaching screw eyes 8 pivotally support the hooks so that the disks may support the hooks against the body and thus limit the swing against the body and thus limit the swinging movement of the hook. To prevent the abrading of the body I provide a protector plate 9 which, in the structure illustrated, has a flange 10 at its rear end overlapping the rear end of the body.

In the structure illustrated, the attaching screw eyes 8 engage the holes 12 and 13 in the plate so that the screw eyes serve the double function of attaching the hooks and securing the plate. The rear hole 13 is in the angle of the plate so that the disk of the rear hook may swing against the side of the plate or against its flange, thus permitting it to swing to a horizontal position, as shown in Fig. II. In practice the plate is formed of bright metal and adds to the attractiveness of the bait. The disks on the shanks also add to the attractiveness of the bait.

The guard 14, in the structure illustrated, is formed of a loop of wire, the bight 15 of the loop being curved down to provide a connecting cross piece for the arms of the guard loosely embracing the under side of the neck 3 so as to coact therewith and constitute a stop limiting the swing of the guard. At the upper ends of the arms are coils 16 forming eyes for the pivots 17. The guard is supported so that it swings freely between its front and rear positions and the head 2 constitutes a guard for the upper end of the guard and the pivots. The arms of the guard diverge downwardly so that the lateral swing of the hook is within the planes of the arms, as indicated by dotted lines in Fig. IV. The hooks ordinarily constitute sufficient weight to keep the body in upright position. In its front position the guard inclines forwardly, as shown by dotted lines, so that in casting it readily passes over any obstruction with which it may come in contact. In its rear position the guard inclines rearwardly so as to readily pass over an obstruction as the bait is drawn forward. The hooks however, are entirely free and independent in their movement from the movement of the guard. When the bait passes over an obstruction it rides upon the guard arms carrying the hooks over the same. By this arrangement of parts the hooks are free to swing within the limits permitted by the disks 6 and at the same time are supported in the proper position to receive the strike of the fish, and as stated, the bait may be drawn through weeds or like obstructions without the hooks becoming engaged.

I have illustrated and described my improved weedless bait or lure in a simple embodiment which I have found to be very desirable. The structure may be greatly modified without departing from my invention. I have not attempted to illustrate or describe various modifications which I contemplate as I believe the disclosure made will enable those skilled in the art to which my invention relates to embody or adapt the same as may be desired.

Having thus described my invention, what I claim as new and desire to secure by Letters Patent, is:

1. In a fish bait or lure, the combination of a body having a head portion and a neck portion and provided with a depending hook, a guard formed of a loop of wire, the bight of the loop being curved downwardly and loosely embracing the under side of the neck portion and constituting a stop member engaging with the neck, the arms being coiled at their upper ends to provide pivot eyes, and pivots engaging said eyes disposed transversely of said neck, said head constituting a guard for said pivots and stop member.

2. In a fish bait or lure, the combination of a body having a head portion and a neck portion and provided with a depending hook, a guard formed of a loop of wire, the bight of the loop constituting a stop member engaging with the neck, the arms being coiled at their upper ends to provide pivot eyes, and pivots engaging said eyes disposed transversely of said neck, said head constituting a guard for said pivots and stop member.

3. In a fish bait or lure, the combination of a body provided with a depending hook, and a pivoted guard formed of a loop constituting a stop member limiting the movement of the guard.

4. In a fish bait or lure, the combination of a body having a head portion and a neck portion and provided with a hook, and a guard pivotally mounted on said neck comprising a pair of spaced arms with a connecting cross piece at their upper ends, said cross piece constituting a stop to limit the pivotal movement of said guard, said guard swinging freely between its front and rear positions, said head constituting a guard for the upper ends of said arm and said cross piece.

5. In a fish bait or lure, the combination of a body having a head portion and a neck portion and provided with a depending hook, and a guard pivotally mounted on said neck comprising a pair of spaced arms, a stop limiting the pivotal movement of said guard and permitting said guard to swing freely between its front and rear positions, said head constituting a guard for the upper ends of said arms.

6. In a fish bait or lure, the combination of a body provided with a hook, a guard comprising a pair of spaced arms with a connecting cross piece at their upper ends, the cross piece and arms being formed integrally of wire with coils at the upper ends of the arms to provide pivot eyes, and pivots engaging said eyes whereby said guard is pivotally supported, said cross piece constituting a stop to limit the pivotal movement of said guard, said guard swinging freely between its front and rear positions.

7. In a fish bait or lure, the combination of the body, a hook pivotally mounted at the front end of the body to depend therefrom, spaced guard arms pivotally mounted on said body to project downwardly therefrom, and a stop member limiting the swing of said guard disposed so that the guard is inclined rearwardly when in its rear position and is inclined forwardly when in its front position, the guard moving freely within the limit of said stop.

8. In a fish bait or lure, the combination with the body of a hook pivotally mounted on said body to depend therefrom, a guard having spaced arms pivotally mounted at the front of said body and adapted to support the body in an elevated position as it is drawn over an obstruction, and means for limiting the movement of said guard on its pivot, the guard being inclined forwardly when in its front position and being inclined rearwardly when in its rear position, the pivotal movement of said guard and said hook on said body being independent of each other.

9. In a fish bait or lure, the combination with the body of a hook pivotally mounted on said body to depend therefrom, a guard having spaced arms pivotally mounted on said body to project downwardly therefrom, a stop member limiting the swing of said guard disposed so that the guard is inclined rearwardly when in its rear position and is inclined forwardly when in its front position, and means for limiting the lateral swing of the hook.

In witness whereof, I have hereunto set my hand and seal in the presence of two witnesses.

CLIFFORD W. BIDWELL. [L. S.]

Witnesses:
MARGARET L. GLASGOW,
LUELLA G. GREENFIELD.